United States Patent
Mora

(10) Patent No.: US 10,202,201 B2
(45) Date of Patent: Feb. 12, 2019

(54) FIRE EXTINCTION DESIGN FOR AN AUXILIARY POWER UNIT COMPARTMENT OF AN AIRCRAFT

(71) Applicant: AIRBUS OPERATIONS, S.L., Getafe Madrid (ES)

(72) Inventor: Angel Palomares Mora, Madrid (ES)

(73) Assignee: AIRBUS OPERATIONS, S.L., Getafe Madrid (ES)

( * ) Notice: Subject to any disclaimer, the term of this patent is extended or adjusted under 35 U.S.C. 154(b) by 230 days.

(21) Appl. No.: 14/951,576

(22) Filed: Nov. 25, 2015

(65) Prior Publication Data
US 2016/0152344 A1 Jun. 2, 2016

(30) Foreign Application Priority Data
Nov. 27, 2014 (EP) .................................... 14382478

(51) Int. Cl.
*B64D 45/00* (2006.01)
*B64D 41/00* (2006.01)
(Continued)

(52) U.S. Cl.
CPC ............. *B64D 45/00* (2013.01); *B64D 33/02* (2013.01); *B64D 41/00* (2013.01); *F01D 5/02* (2013.01);
(Continued)

(58) Field of Classification Search
CPC ............ B64D 33/02; B64D 2033/0213; B64D 2045/009; A62C 3/08; A62C 99/0009
See application file for complete search history.

(56) References Cited

U.S. PATENT DOCUMENTS 5,284,012 A * 2/1994 Laborie ................. B64D 33/08
244/53 B
6,343,465 B1 * 2/2002 Martinov ................. A62C 3/08
244/135 R
(Continued)

FOREIGN PATENT DOCUMENTS

EP           0743247 A2     11/1996
WO      2004074096 A1      9/2004

OTHER PUBLICATIONS

European Search Report, dated May 18, 2015; 4 Pages.
Extended European Search Report; dated May 6, 2015; 4 Pages.

*Primary Examiner* — Richard R. Green
(74) *Attorney, Agent, or Firm* — John S. Artz; Dickinson Wright PLLC

(57) ABSTRACT

The invention refers to an APU compartment, and a method for extinguishing a fire in an APU compartment. The APU compartment (1) comprises an APU (2), an exhaust (5), an aperture (7) providing a passage between the APU compartment (1) and the inside of the exhaust (5), and a fire detection system, wherein the APU compartment (1) of the invention is constructed as an air tight compartment, and additionally comprises a conduit (9) for providing external air to the APU compartment (1), a door (8) for closing the conduit (9) inlet, and a control unit (6) configured to close the door (8) when a fire is detected, such that when the door (8) is closed and the APU (2) is in operation, the air contained in the APU compartment (1) is sucked through the aperture (7) to be expelled out of the APU compartment (1) to extinguish the fire.

10 Claims, 1 Drawing Sheet

(51) Int. Cl.
*B64D 33/02* (2006.01)
*F01D 5/02* (2006.01)
*F01D 25/30* (2006.01)
*F02C 7/04* (2006.01)

(52) U.S. Cl.
CPC ........... *F01D 25/30* (2013.01); *F02C 7/04* (2013.01); *B64D 2033/0213* (2013.01); *B64D 2045/009* (2013.01); *F05D 2220/50* (2013.01); *F05D 2240/24* (2013.01); *Y02T 50/44* (2013.01)

(56) References Cited

U.S. PATENT DOCUMENTS

| | | | | |
|---|---|---|---|---|
| 7,040,576 B2 * | 5/2006 | Noiseux | ............ | A62C 2/14 244/129.2 |
| 7,093,666 B2 * | 8/2006 | Trumper | ............ | B64D 41/00 169/48 |
| 7,540,142 B2 * | 6/2009 | Sheoran | ............ | F02C 7/042 137/15.1 |
| 2005/0151017 A1 | 7/2005 | Noiseux et al. | | |
| 2005/0268593 A1 | 12/2005 | Hagshenas | | |
| 2007/0193277 A1 | 8/2007 | Shearan et al. | | |

* cited by examiner

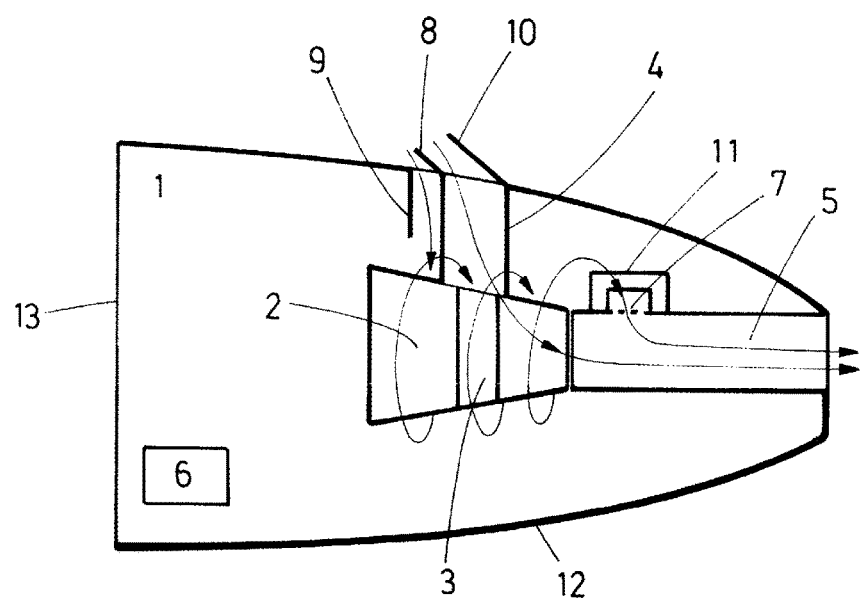

FIRE EXTINCTION DESIGN FOR AN AUXILIARY POWER UNIT COMPARTMENT OF AN AIRCRAFT

CROSS-REFERENCE TO RELATED APPLICATIONS

The present application claims priority to European Application No. 14382478.7 filed on Nov. 27, 2014, which is hereby incorporated by reference, as though set forth fully herein.

FIELD OF DISCLOSURE

The present invention refers to an auxiliary power unit ("APU") compartment especially designed for extinguishing a fire, and a method for extinguishing a fire in an APU compartment of an aircraft.

An object of the invention is to provide an APU compartment and method which offer a quick response against fire once the fire has been detected in the APU compartment. Thus, it is also an object of the present invention to minimize the damage that a fire conventionally caused in the APU compartment would produce.

Another object of the present invention is to provide an APU compartment and method that achieve fire extinction at the same time that provide a weight reduction by avoiding the use of current fire prevention components and fire extinguishing systems.

Another object of the present invention is to provide an APU compartment and method that achieve fire extinction in the whole APU compartment, even when the fire occurs in complex access zones.

BACKGROUND OF THE DISCLOSURE

Conventionally, an APU compartment is a part of a rear end of an aircraft intended to house an APU and all the components and systems required for its functioning. The APU is a small turbine engine designed to provide electrical, hydraulic, or pneumatic power to some systems of an aircraft, such as the air conditioning system, the main engine starting system, and the anti-ice system.

The need of fuel and the high level of temperatures reached by the engine, converts the APU into a component susceptible of starting a fire. For that, the most likely areas of the APU to start up or suffer a fire, such as the combustion chamber, are conventionally monitored to achieve a prompt detection of fire. Typical fire detection systems involve the use of detector wirings extended around such critical areas of the APU and also around its compartment for detecting temperature.

Following the fire detection, the APU is conventionally shut down at the time that the fire extinction system of the APU compartment is started. Providing a quick and effective fire extinction is also a concern in the aeronautical industry.

For this purpose, APU compartments are conventionally provided with halon fire extinguishers. Such halon fire extinguishers have been used for years. Several patent documents deal with these halon fire extinguishers. For instance, patent application U.S. Pat. No. 4,625,808A describes a device to be coupled to a fire extinguisher containing a source of pressurized fire suppression chemical, such as halon compounds. This invention extends the use of the fire extinguishers provided in the aircraft, gaining access to inaccessible areas or to areas not equipped with fire extinguishers.

However, halon fire extinguishers contain substances harmful to the environment. For this reason, they are being replaced by other fire extinction systems. With this purpose, Patent Application US2013240218A1 describes the use of an organic blend of compounds to create a fire suppression agent. However, some of the organic compounds used by the invention, such as carbon dioxide, also pollute the environment. Besides, additional care should be taken in relation to the boiling points of the organic compounds involved in the blend, and also to the boiling point of the result of the mixture.

Therefore, it would be desirable to provide technical means for achieving fire suppression and extinguishing in an APU compartment, which in addition to be environmentally friendly, are able to provide a quick response against fire, and enable protecting the whole compartment.

SUMMARY OF THE DISCLOSURE

The present invention overcomes the abovementioned drawbacks by providing a design for the auxiliary power unit compartment of an aircraft, and a method for extinguishing a fire in an auxiliary power unit compartment of an aircraft, which provide a quick response against fire, and minimizes the damage usually caused to the aircraft without damaging the environment.

A first aspect of the invention refers to an auxiliary power unit compartment of an aircraft that comprises an auxiliary power unit placed in the auxiliary power unit compartment and comprising a turbine, an intake duct for providing external air to the turbine, an exhaust for expelling combustion gases to the atmosphere, an aperture providing a passage between the auxiliary power unit compartment and the inside of the exhaust, and a fire detection system for detecting a fire within the auxiliary power unit compartment. According to the invention, the auxiliary power unit compartment is constructed as an air tight compartment, and additionally comprises a conduit, a door for closing the conduit inlet, and a control unit. The conduit is suitable for providing external air to the space contained in the auxiliary power unit compartment and outside of the auxiliary power unit. The control unit is configured to close the door when a fire is detected by the fire detection system, so that when the door is closed and the auxiliary power unit is in operation, the air contained in the auxiliary power unit compartment is sucked through the aperture to be expelled out of the auxiliary power unit compartment to extinguish the fire.

In terms of the present invention, an auxiliary power unit compartment should be understood as a part of a rear end of an aircraft and is intended to house an auxiliary power unit and all components and systems required for its operation.

The invention provides an APU compartment specially designed for extinguishing a fire after being detected. For that, a conventional APU compartment has been provided with a fireproof and an air tight configuration, and with means capable of controlling the entrance of external air inside the APU compartment. These means are intended to avoid the entrance of external air once a fire is detected, so that the fire is extinguished because of the consumption of the air contained in the APU compartment. Thus, since the APU compartment design is based on air management, unharmful fire extinction is achieved by the invention.

In addition, the APU compartment design is provided with means for ensuring the consumption of the air contained in the APU compartment. Said consumption is performed due to the APU operation, which causes the air contained in the APU compartment to be sucked by means of an aperture conventionally provided in known APU compartments. Such aperture provides a passage of air between the APU compartment and the inside of the exhaust, from which the air contained in the APU compartment is finally expelled to the atmosphere.

Besides, the aperture allows for providing a quick consumption of the air contained in the APU compartment, provided the APU is in operation and no additional air enters the compartment. The APU functioning causes that the air contained in the space comprised inside the APU compartment but outside the APU, is sucked through the aperture by venturi effect to be finally expelled out of the APU compartment by means of the exhaust.

The APU compartment design offers an easy integration in known APU compartments. Also, taking advantage of the aperture conventionally provided in APU compartment facilitates further the integration of the design proposed by the present invention.

Additionally, the invention achieves a weight reduction because current fire extinguishing systems and other fire prevention components are no longer needed.

In addition, the invention offers a durable cost-effective fire extinction solution, since said solution involves a design for the APU compartment. Thus, the invention precludes the need of chemical compounds, or any other substances contained on a device that requires being periodically checked and replaced.

Also, the APU compartment design allows extinguishing a fire in the whole APU compartment, independently whether the fire is set in a complex access zone. In this context, the invention provides an effective and reliable solution against fire.

A second aspect of the invention refers to a method for extinguishing a fire in an auxiliary power unit compartment of an aircraft, wherein the method comprises:
  providing an auxiliary power unit in the auxiliary power unit compartment,
  detecting a fire,
  providing an auxiliary power unit compartment as air tight compartment,
  providing a conduit for introducing external air into the auxiliary power unit compartment,
  closing the conduit to prevent the entrance of external air inside the auxiliary power unit compartment when a fire is detected, and
  sucking the air contained inside the auxiliary power unit compartment by an aperture of the auxiliary power unit, the aperture providing a passage between the auxiliary power unit compartment and an exhaust of the auxiliary power unit, said sucking caused by venturi effect due to the auxiliary power unit operation and lasting until the difference of pressure between the inside of the exhaust and the auxiliary power unit compartment is compensated thereby, consuming the air contained in the auxiliary power unit compartment and extinguishing the fire.

According to this second aspect, the invention provides a method that ensures fire extinction when a fire occurs in an APU compartment. The extinction provided is environmentally friendly, since it is achieved by producing a lack of air, and more specifically, by a lack of oxygen in the compartment.

Additionally, the method provides a quick response against fire in the APU compartment. This way, the method achieves a fire damage reduction because of the lower exposure time to fire of the APU compartment components.

BRIEF DESCRIPTION OF THE DRAWINGS

For a better comprehension of the invention, the following drawing is provided for illustrative and non-limiting purposes, wherein:
FIG. 1 shows a schematic view of an APU compartment according to an embodiment of the present invention.

DETAILED DESCRIPTION OF THE PRESENT DISCLOSURE

FIG. 1 shows a side schematic view of an APU compartment 1 according to the invention. Regarding the invention, the APU compartment 1 comprises a part of the fuselage of the rear end of an aircraft, the space contained inside thereof and, all components and systems contained therein. As shown in FIG. 1, the APU compartment 1 is delimited by the fuselage 12 and a firewall 13 of the aircraft that separates the APU compartment 1 from the rest of the aircraft. The firewall 13 prevents fire propagation in the event that it occurs.

Conventionally, the APU compartment 1 comprises an auxiliary power unit 2 provided with a turbine 3, an intake duct 4 for providing external air to the turbine 3, an exhaust duct 5 for expelling combustion gases, and an aperture 7 providing an airflow between the APU compartment 1 and the inside of the exhaust 5. Also, the APU compartment 1 is conventionally provided with a fire detection system responsible for triggering a fire detection alarm when the temperature sensed by the system is considered as fire indication.

In addition to these, the design of the APU compartment 1 is constructed as a fireproof air tight compartment. Such air tight construction embraces an initial air tight configuration for the fuselage 12 of the APU compartment 1, and also any adaptation required by conventional APU compartments to become air tight, such as sealing any gap or opening provided in the fuselage 12 of the APU compartment 1.

Additionally, the APU compartment 1 of the invention comprises means for preventing the entrance of external air inside the APU compartment 1. Said means enable controlling the air contained in the APU compartment. Thus, in the event of a fire, said means avoid feeding the fire with more oxygen than that already contained in the APU compartment. According to the invention, said means comprise a conduit 9, a door 8 for closing the conduit 9 inlet, and a control unit 6 for controlling the door 8. The conduit 9 is suitable for providing external air to the APU compartment 1. Thus, the conduit 9 also serves for providing cooling air to the APU compartment 1, helping to maintain an acceptable APU compartment air temperature.

When a fire is detected, the control unit 6 is programmed to activate the closing of the door 8. Hence, the APU 2 operation causes the air contained in the APU compartment 1 to be sucked through the aperture 7 by venturi effect until the difference of pressure between the inside of the exhaust 5 and the APU compartment 1 is compensated. This absorption of air occurs instantly. Thus, the air comprised in the space contained in the APU compartment 1 and the outside of the APU 2, is expelled out of the APU compartment 1 by the exhaust 5. This way, the invention removes the oxygen contained in the APU compartment 1 to perform the fire extinction. Therefore, the invention achieves fire extinction without producing any damage to the environment.

According to a preferred embodiment, the control unit 6 is also operable to shut off the APU 2 once the fire is extinct. Doing the control unit 6 responsible for shutting off the APU 2 after a predetermined time, the invention ensures a safe final state for the APU compartment 1.

According to another preferred embodiment, the intake duct 4 comprises an intake door 10, and the control unit 6 is operable to close said intake door 10 when the APU 2 is shut off. Once the fire is extinct and the APU 2 is shut off, the control unit 6 can be configured to close the intake door 10 because the turbine 3 of the APU 2 no longer needs external air. Additionally, closing the intake door 10 helps protecting the APU compartment, especially when the APU is not going to be restarted for a while.

According to another preferred embodiment, the conduit 9 is formed as a part of the intake duct 4. Thus, the inlet of the intake duct 4 that is conventionally provided in the APU compartment 1, can be used both for providing external air to the to the APU compartment 1 and to the turbine 3. This embodiment avoids providing another inlet for the conduit 9.

As shown in FIG. 1 and according to another preferred embodiment, the APU 2 comprises an oil cooler 11, wherein said oil cooler 11 comprises the aperture 7.

In another preferred embodiment, the door 8 that closes the conduit 9 inlet is provided at the fuselage of the rear end of an aircraft, preferentially, at the fuselage 12 of the APU compartment 1.

Additionally, according to another preferred embodiment, the intake door 10 that closes the intake duct 4 inlet is provided at the fuselage of the rear end of an aircraft. Likewise, preferentially, said intake door 4 is provided at the fuselage 12 of the APU compartment 1.

What is claimed:

1. An auxiliary power unit compartment (1) of an aircraft, comprising:
    an auxiliary power unit (2) placed in the auxiliary power unit compartment (1) and having a turbine (3);
    an intake duct (4) having an intake door (10), the intake duct (4) for providing external air only to the turbine (3) and not to the auxiliary power unit compartment (1);
    an exhaust (5) for expelling combustion gases;
    an aperture (7) providing a passage between the auxiliary power unit compartment (1) and an inside of the exhaust (5), and
    a temperature dependent fire detection system associated with the auxiliary power unit compartment (1) for detecting a fire within the auxiliary power unit compartment (1),
    wherein the auxiliary power unit compartment (1) is constructed as an air tight compartment and includes a conduit (9) for providing external air only to the portion of the space inside the auxiliary power unit compartment (1) that is outside of the auxiliary power unit (2), a door (8) for closing the conduit (9) inlet, and a control unit (6) being configured to independently close and open both the intake door (10) and the door to conduit (9) and also configured to close the door (8) while maintaining the intake door (10) open when a fire is detected by the fire detection system, such that when the door (8) is closed and while the auxiliary power unit (2) is in operation, the air contained in the auxiliary power unit compartment (1) is pulled out through the aperture (7) and expelled out of the auxiliary power unit compartment (1) through the exhaust (5) to thereby extinguish the fire.

2. The auxiliary power unit compartment (1) of claim 1, wherein the control unit (6) is operable to shut off the auxiliary power unit (2) once the fire is extinguished.

3. The auxiliary power unit compartment (1) of claim 1, wherein the control unit (6) is operable to close the intake door (10) when the auxiliary power unit (2) is shut off.

4. The auxiliary power unit compartment (1) of claim 1, wherein the conduit (9) is formed as a part of the intake duct (4).

5. The auxiliary power unit compartment (1) of claim 1, wherein the auxiliary power unit (2) has an oil cooler (11), and wherein said oil cooler (11) comprises the aperture (7).

6. The auxiliary power unit compartment (1) of claim 1, wherein the door (8) is provided at a fuselage (12) of the rear end of an aircraft.

7. The auxiliary power unit compartment (1) of claim 1, wherein the intake duct (4) is provided at a fuselage (12) of the rear end of an aircraft.

8. A method for extinguishing a fire in an auxiliary power unit compartment (1) of an aircraft, the method comprising the steps of:
    providing an auxiliary power unit (2) located in the auxiliary power unit compartment (1);
    detecting a fire within the auxiliary power unit compartment (1) based on a temperature change within the compartment (1);
    providing the auxiliary power unit compartment (1) as an air tight compartment;
    providing a conduit (9) having a door (8) for introducing external air only into the auxiliary power unit compartment (1) and a separate intake duct (4) having an intake door (10) for providing external air only to the auxiliary power unit;
    closing the door (8) to the conduit (9) to prevent the entrance of external air into the auxiliary power unit compartment (1) when a fire is detected while maintaining the intake door (10) in an open position to provide external air to the auxiliary power unit, and
    when a fire is detected inside the auxiliary power unit compartment (1) maintaining the auxiliary power unit in an on condition thereby pulling the air contained inside the auxiliary power unit compartment (1) out through an aperture (7) of the auxiliary power unit (2), the aperture (7) providing a passage between the auxiliary power unit compartment (1) and an exhaust (5) of the auxiliary power unit (2), the pulling of air lasting for a period of time until a pressure differential between the inside of the exhaust (5) and the auxiliary power unit compartment (1) is compensated, thereby removing the air contained in the auxiliary power unit compartment (1) and also extinguishing the fire.

9. The method for extinguishing a fire of claim 8, further comprising:
    shutting off the auxiliary power unit (2) once the fire is extinguished.

10. The method for extinguishing a fire of claim 9, further comprising:
    closing the intake door (10) to prevent the entrance of external air through the intake duct into the auxiliary power unit (2) once the fire is extinguished.

* * * * *